US007992099B2

(12) United States Patent
Jin et al.

(10) Patent No.: US 7,992,099 B2
(45) Date of Patent: Aug. 2, 2011

(54) APPARATUS AND METHOD FOR PROVIDING GRAPHIC USER INTERFACE COMPOSED OF PLURAL COLUMNS

(75) Inventors: Young-kyu Jin, Seoul (KR); Sun-wha Chung, Yongin-si (KR); Hee-seon Park, Seoul (KR); Kyoung-hoon Yi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 11/321,598

(22) Filed: Dec. 30, 2005

(65) Prior Publication Data

US 2006/0150115 A1 Jul. 6, 2006

(30) Foreign Application Priority Data

Dec. 31, 2004 (KR) .................. 10-2004-0118027

(51) Int. Cl.
*G06F 3/048* (2006.01)

(52) U.S. Cl. ........ 715/810; 715/734; 715/735; 715/736; 715/737; 715/738; 715/739; 715/776; 715/825; 715/854

(58) Field of Classification Search .................. 715/810
See application file for complete search history.

(56) References Cited

U.S. PATENT DOCUMENTS

| 5,714,971 | A | * | 2/1998 | Shalit et al. ............ 715/804 |
| 6,288,720 | B1 | * | 9/2001 | Zimmerman et al. ........ 715/810 |
| 7,200,145 | B1 | * | 4/2007 | Edsall et al. ............ 370/389 |
| 7,210,106 | B1 | * | 4/2007 | Delnoij et al. ............ 715/810 |
| 7,565,623 | B2 | * | 7/2009 | Beam et al. ............ 715/810 |
| 2002/0080187 | A1 | * | 6/2002 | Lawton ............ 345/810 |
| 2003/0007010 | A1 | * | 1/2003 | Ullmann et al. ............ 345/810 |
| 2003/0233452 | A1 | * | 12/2003 | Maufer et al. ............ 709/225 |
| 2004/0130578 | A1 | * | 7/2004 | Charney ............ 345/810 |
| 2005/0102633 | A1 | * | 5/2005 | Chen et al. ............ 715/821 |
| 2005/0268244 | A1 | * | 12/2005 | Vignet ............ 715/760 |
| 2006/0036733 | A1 | * | 2/2006 | Fujimoto et al. ............ 709/225 |

FOREIGN PATENT DOCUMENTS

| EP | 1434411 A1 | 6/2004 |
| JP | 7-146774 A | 6/1995 |
| JP | 2000-203357 A | 7/2000 |

(Continued)

OTHER PUBLICATIONS

Japanese Office Action issued on Mar. 22, 2011 in the corresponding Japanese Patent Application No. 2008-22429.

*Primary Examiner* — Dennis-Doon Chow
*Assistant Examiner* — Anil N Kumar
(74) *Attorney, Agent, or Firm* — Sughrue Mion, PLLC (57) ABSTRACT

An apparatus and method for providing a graphic user interface composed of a plurality of columns. The apparatus includes a command receiving unit, a determining unit, a display unit, and a transmitting/receiving unit. The command receiving unit receives a movement command or a selection command for a selector for selecting an item of at least one of the columns on the graphic user interface. The determining unit determines whether to activate items of the other columns associated with the selected item of a column. The display unit outputs the activated items of the other columns using the graphic user interface. The transmitting/receiving unit transmits a command message according to item selection with respect to the output activated columns.

21 Claims, 8 Drawing Sheets

FOREIGN PATENT DOCUMENTS

| | | |
|---|---|---|
| JP | 2001-119765 A | 4/2001 |
| JP | 2001-285964 A | 10/2001 |
| JP | 2001-313875 A | 11/2001 |
| JP | 2002-132407 A | 5/2002 |
| JP | 2003-015670 A | 1/2003 |
| JP | 2004-129154 A | 4/2004 |
| KR | 1999-0086325 A | 12/1999 |
| KR | 2003-0070081 A | 8/2003 |
| KR | 2003-0073433 A | 9/2003 |
| KR | 2004-0070374 A | 8/2004 |

* cited by examiner

| SOURCE DEVICE | TARGET DEVICE | WORK COMMAND | CONTENT TYPE | TARGET CONTENT LIST |
|---|---|---|---|---|
|  | LIVING ROOM TV | WATCH | MOVIE | DVD PLAYER/Star wars Episode 2 |

| SOURCE DEVICE | TARGET DEVICE | WORK COMMAND | CONTENT TYPE | TARGET CONTENT LIST |
|---|---|---|---|---|
|  | AUDIO DEVICE | LISTEN | MUSIC | AUDIO DEVICE/AUDIO ALBUM 1 |

| SOURCE DEVICE | TARGET DEVICE | WORK COMMAND | CONTENT TYPE | TARGET CONTENT LIST |
|---|---|---|---|---|
| CD PLAYER | PDA | COPY | MUSIC | CD PLAYER/AUDIO ALBUM 1 |

| SOURCE DEVICE | TARGET DEVICE | WORK COMMAND | CONTENT TYPE | TARGET CONTENT LIST |
|---|---|---|---|---|
|  | AIR CONDITIONER, HEATER | INCREASE | TEMPERATURE | 2 °C |

FIG. 15

| WORK COMMAND | CONTENT TYPE | TARGET DEVICE |
|---|---|---|
| LISTEN | MUSIC | LIVING ROOM TV BED ROOM TV AUDIO DEVICE |
|  |  |  |

1510

⋮

| CONTENT TYPE | WORK COMMAND | TARGET DEVICE |
|---|---|---|
| MUSIC | LISTEN COPY | LIVING ROOM TV BED ROOM TV AUDIO DEVICE PDA |
|  |  |  |

1520

⋮

| TARGET DEVICE | WORK COMMAND | CONTENT TYPE |
|---|---|---|
| LIVING ROOM TV | LISTEN WATCH | MOVIE MUSIC |
|  |  |  |

1530

⋮

APPARATUS AND METHOD FOR PROVIDING GRAPHIC USER INTERFACE COMPOSED OF PLURAL COLUMNS

CROSS-REFERENCE TO RELATED APPLICATION

This application claims priority from Korean Patent Application No. 10-2004-118027 filed on Dec. 31, 2004, in the Korean Intellectual Property Office, the disclosure of which is incorporated herein by reference in its entirety.

BACKGROUND OF THE INVENTION

1. Field of the Invention

The present invention relates to an apparatus and method for providing a graphic user interface composed of a plurality of columns, and more particularly, to an apparatus and method for providing a graphic user interface composed of a plurality of columns to allow a user to work on content with a selected target device according to a user-generated column selection order using a graphic user interface including a work command column, a content type column, and a target device column.

2. Description of the Related Art

Related art environments having networked equipment were typically limited to specific users. However, the wide spread of the Internet has substantially influenced the whole field of the digital industry. Internet-based services and contents have become barometers of the $21^{st}$-century digital industry. The advent of global communication networks, such as the high-speed Internet networks, cellular phones, personal digital assistants (PDA), or notebook computers, has brought to the forefront previously impracticable capabilities. What was at one time a mechanism for rudimentary data exchange has evolved, and continues to evolve into a means for distributing a wide variety of media.

The concept of computer-based information communication changes to the concept of Ubiquitous. "Ubiquitous" is a Latin word which has a meaning of "being in existence anywhere and anytime", and in the recent communication technology, the word is used to define an environment which enables a user to freely access a network regardless of location.

Figure 1:
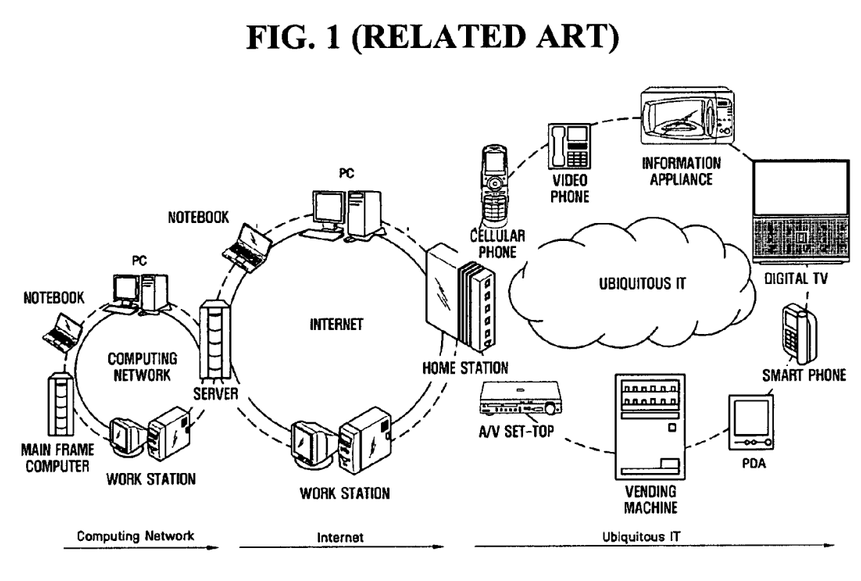
FIG. 1 shows the evolution of digital information appliances.

FIG. 1 shows the evolution of digital information appliances. In the 1980s (the computing network age), personal computers (PC), notebooks, main frame computers, and work stations constituted a network to communicate information. The networking was limited to laboratory or office purposes.

The advancement of the Internet in the 1990s, however, has enabled home stations to gradually gain public attention, and the limited Internet networking has become available to individuals and home appliances.

In the 2000s, wireless networks have been proliferated remarkably, and the transmission speed of cable networks has increased tremendously. As a result, the distribution of large-scale multimedia content has begun to hit its' stride and digital broadcasting is being actively researched. In addition, some digital broadcasting services have already come into common use. Various electronic appliances have evolved into information appliances under the concept of Ubiquitous. Digital information now can be exchanged through not only computers or workstations but also digital televisions, cellular phones, video phones, or smart phones, and can also be transmitted and received between electronic appliances such as a refrigerator, a microwave oven, and an air conditioner via the home network and Ubiquitous network.

Figure 2:
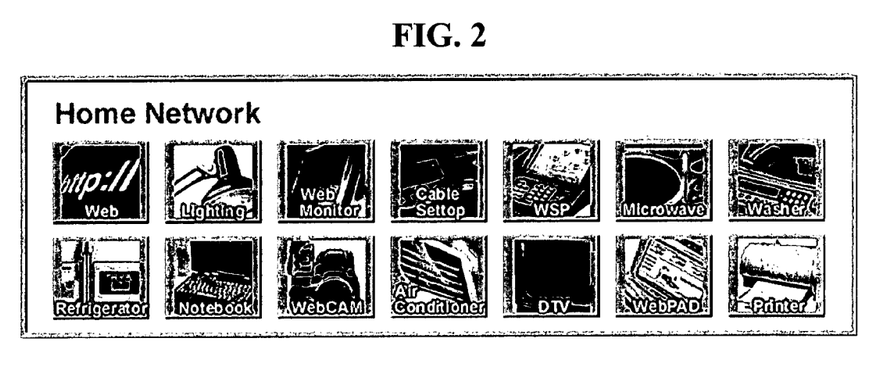
FIG. 2 illustrates a related art home network user interface based on electronic appliances.

FIG. 2 illustrates a related art home network user interface based on electronic appliances. A user can work on a home network based on electronic appliances. In other words, after first selecting a target device, the user issues a command to the selected target device or uses media sources of the selected target device. In this case, the user selects a target device from devices illustrated in FIG. 2, and checks the function of the selected device to work as desired.

At this time, it is assumed that the user already recognizes the state and function of the target device like when the user desires to watch a TV or to control indoor temperature by manipulating an air conditioner.

However, as the number of devices constituting a home network increases, it is difficult for the user to know the states and functions of all the devices of the home network. For example, when the user desires to control indoor temperature, the user may become confused as to whether to manipulate an air conditioner or a heater. When the user desires to listen to music, but does not know to what device target the content is connected, the home network user interface based on devices cannot provide a desirable result to the user.

Figure 3:
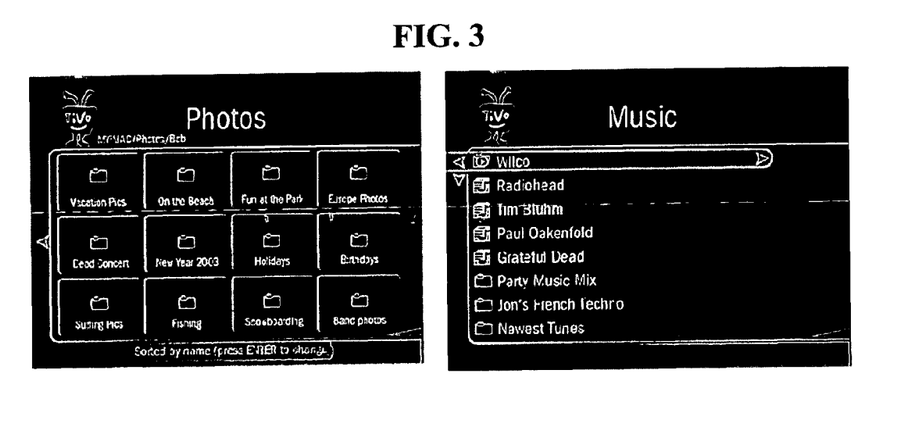
FIG. 3 illustrates a related art home network user interface based on content.

FIG. 3 illustrates a related art home network user interface based on content. When a user works on a home network, the user can work based on content. In other words, after selecting desired target content, the user checks a target device that operates the target content and operates the target content using the target device. In this case, the user selects content from listed content and works as desired using a target device appearing with the selection, such as when the operation of the target content through the target device is simple and the user reproduces music content using an audio device, or watches sky wave broadcasting on a TV.

However, as devices constituting a home network have various functions, the user can perform various operations on single content. For example, the user can perform various operations, such as screen display, copy, edit, and print, on still image content.

Since the method of using a home network becomes more complicated with the development of the home network, it is not easy for the user to obtain a desired result using a related art method that does not consider a home network device, a content type, and a work command.

SUMMARY OF THE INVENTION

The present invention provides an apparatus and method for providing a graphic user interface composed of a plurality of columns, in which a plurality of parallel graphic user interfaces is provided to allow a user to obtain a desired result according to a user determined order.

The present invention also provides an apparatus and method for providing a graphic user interface composed of a plurality of columns, in which selectable items of the other columns are displayed after selection of an item of a column to allow a user to obtain a desired result without a need for the user to memorize the selectable items of the other columns after selection of the item of the column.

According to an aspect of the present invention, there is provided is an apparatus for providing a graphic user interface composed of a plurality of columns. The apparatus includes a command receiving unit, a determining unit, a display unit, and a transmitting/receiving unit. The command receiving unit receives a movement command or a selection command for a selector for selecting an item of at least one of the columns on the graphic user interface. The determining unit determines whether to activate items of the other columns associated with the selected item of a column. The display unit outputs the activated items of the other columns using the graphic user interface. The transmitting/receiving unit transmits a command message according to item selection with respect to the output activated columns.

According to another aspect of the present invention, there is provided is a method for providing a graphic user interface composed of a plurality of columns, the method including receiving a movement command or a selection command of a selector for selecting an item of at least one of the columns on the graphic user interface, determining whether to activate items of the other columns associated with the selected item of a column, outputting the activated items of the other columns using the graphic user interface, and transmitting a command message according to item selection with respect to the output activated columns.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS

The present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Like reference numerals refer to like elements throughout the specification.

The present invention will now be described more fully with reference to the accompanying drawings, in which an exemplary embodiment is shown.

Figure 4:
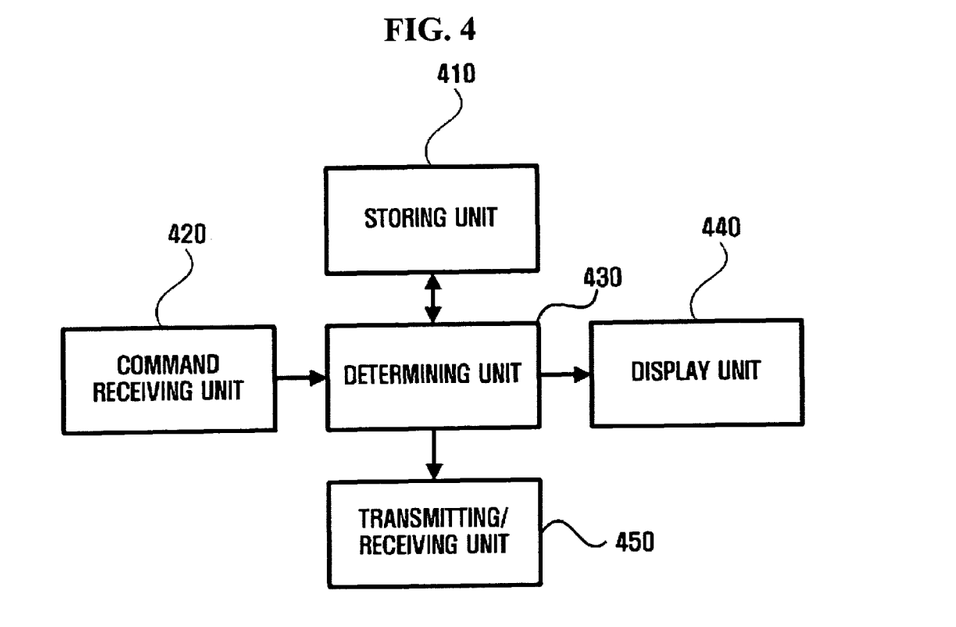
FIG. 4 is a block diagram of an apparatus for providing a graphic user interface composed of a plurality of columns according to an exemplary embodiment.

FIG. 4 is a block diagram of an apparatus for providing a graphic user interface composed of a plurality of columns according to an exemplary embodiment. The apparatus includes a storing unit 410, a command receiving unit 420, a determining unit 430, a display unit 440, and a transmitting/receiving unit 450.

The command receiving unit 420 receives a movement command and a selection command for a selector for selecting an item of one of a plurality of columns on a graphic user interface. The columns include at least one of a work command column, a content type column, a target device column, and a size column. Each of the columns includes at least one item.

For example but not by way of limitation, the work command column includes a watch item, a listen item, a view item, a copy item, a print item, a slide show item, an increase item, and a decrease item; the content type column includes a movie item, a music item, a photo item, a temperature item, and a lighting item; and the target device column includes a living room TV item, a bed room TV item, a personal digital assistant (PDA) item, a personal computer (PC) item, a compact disc (CD) player item, a digital versatile disc (DVD) player item, an audio device item, an air conditioner item, and a heater item.

The selector is a cursor for focusing an item of a column according to a user's movement command. Once a user sends a movement command for the selector in a wired or wireless manner using a direction button or a jog shuttle key included in a remote controller or a keypad, the command receiving unit 420 receives the movement command and transmits the movement command to the determining unit 430.

The determining unit 430 determines whether to activate items of the other columns according to a selected item of a column, and transmits a command message corresponding to the selected item of the column through the transmitting/receiving unit 450.

The user can select an item of a column using a remote controller or a keypad regardless of a column order. In other words, the user can select an item of one of the work command column, the content type column, and the target device column.

If an item of the work command column is selected, the determining unit 430 determines whether to activate items of the content type column and the target device column suitable for the characteristic of the selected item.

For example, if a view item of the work command column is selected, an item of the content type column associated with the view item is the movie item. Thus, only the movie item is activated and the other items of the content type column are deactivated. In addition, since items of the target device column associated with the view item are the living room TV item, the bed room TV item, the PDA item, and the DVD player item, only the associated items are activated, while the other items of the target device column are deactivated.

To determine whether to activate items of the other columns, the determining unit 430 may use a table in which an item of a column is mapped to items of the other columns according to its characteristic. Alternatively, the determining unit 430 may use an algorithm.

In addition, the determining unit 430 may receive the states of items of the target device column transmitted from the transmitting/receiving unit 450 and reflect the states into determination whether to activate items or transmission of a command message. In other words, when a specific item of the target device column is in operation, it may be deactivated or be indicated as "in operation", or a selected work command may be transmitted directly to a corresponding item of the target device column without activation of the other items of the target device column according to the selected work command column or content type column. For example but not by way of limitation, when the user desires to increase indoor temperature, the determining unit 430 receives the states of the air conditioner and heater and transmits a work command to the air conditioner or the heater according to the set temperature.

The storing unit 410 stores a table in which an item of a column is mapped to items of the other columns according to its characteristic. To create the table, whenever an item is added to a column, the user may match the added item of the column to appropriate items of the other columns and store the added item. In addition, whenever an item is added to a column, the apparatus for providing a graphic user interface may collect information about items of the work command column and the content type column provided by each item of the target device column, and creates and stores the table corresponding to the collected information.

The determining unit 430 can use the collected information about items of the work command column and the content type column provided by each item of the target device column to determine whether to activate items of columns through an algorithm.

The display unit 440 outputs items of activated columns using a graphic user interface. Items of activated columns can be output separately for each of the activated columns on a screen. When all items cannot be output on the screen at a time, only a number of items are displayed on the screen with a scroll bar, and the other items are displayed according to a user's selection.

Upon selection of an item of a column, items of the other columns associated with the selected item are activated. At this time, the associated items of other columns can be activated, and the other items of other columns are deactivated to prevent the other items from being selected.

In addition, when an item of a column is selected, only items of the other columns associated with the selected item are displayed on a screen; the other items of other columns are removed from the screen, thereby providing a simple screen configuration to the user.

The transmitting/receiving unit 450 receives the states of items of the target device and transmits a selected item of the work command column corresponding to a selected item of the content type column associated with a selected item of the target device column.

Thus, information transmitted to the target device through the transmitting/receiving unit 450 may include selected items of the target device column, the content type column, and the work command column.

A command message may be transmitted through the transmitting/receiving unit 450 to a target device in a unicast or broadcast manner. When the command message is broadcast to the target device, the command message transmitted through the transmitting/receiving unit 450 includes information about the target device as a destination host. Thus, devices of a home network receive the broadcast command message. If the received command message is associated with a corresponding device, the corresponding device executes a work command corresponding to a content type included in the command message. Unless the received command message is associated with a corresponding device, the corresponding device ignores the received command message.

An information message may also be transmitted from a target device to the transmitting/receiving unit 450 in a unicast or broadcast manner. When the information message is broadcast to the transmitting/receiving unit 450, the information message transmitted to the target device also indicates the apparatus for providing a graphic interface user as a destination host. Thus, the transmitting/receiving unit 450 may receive the broadcast information message and transmit the same to the determining unit 430.

For reference, the apparatus for providing a graphic user interface having a plurality of columns according an exemplary embodiment may include only the determining unit 430 and the transmitting/receiving unit 450, while the other elements such as the storing unit 410, the command receiving unit 420, and the display unit 440 may be implemented through information communication in a wired or wireless manner.

Figure 5:
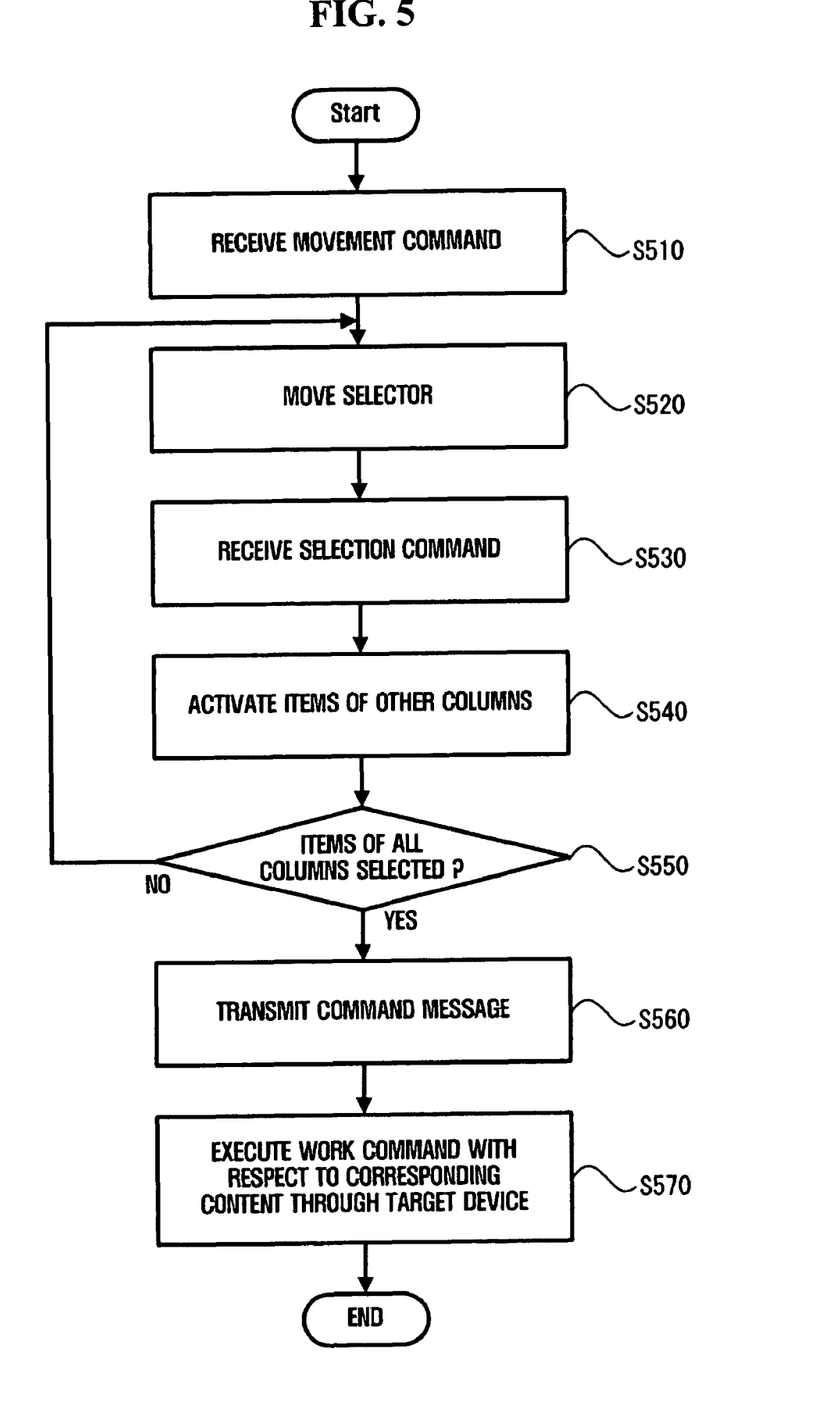
FIG. 5 is a flowchart illustrating a method for providing a graphic user interface composed of a plurality of columns according to an exemplary embodiment.

FIG. 5 is a flowchart illustrating a method for providing a graphic user interface composed of a plurality of columns according to an exemplary embodiment. Once the command receiving unit 420 receives a movement command of a selector in step S510, the selector is moved between columns or items of the columns in step S520. When the command receiving unit 420 receives a selection command in step S530, the determining unit 430 determines whether to activate items of the other columns associated with an item of a column focused by the selector and corresponding items are output on a screen in step S540.

The determining unit 430 may determine whether to activate the associated items using a previously stored table in which items of columns are mapped to one another or using information about items of the work command column and the content type column collected from each item of the target device when receiving the selection command.

The user may select an item among items of the activated columns. At this time, whether to activate items of the other columns associated with the initially selected column is determined and corresponding items are output on the screen in step S540.

Such a procedure continues until items are selected from all columns. After corresponding items are selected from all columns in step S550, a corresponding command message is transmitted to a target device in step S560. The target device executes a work command corresponding to a transmitted content type in step S570.

Figure 6:
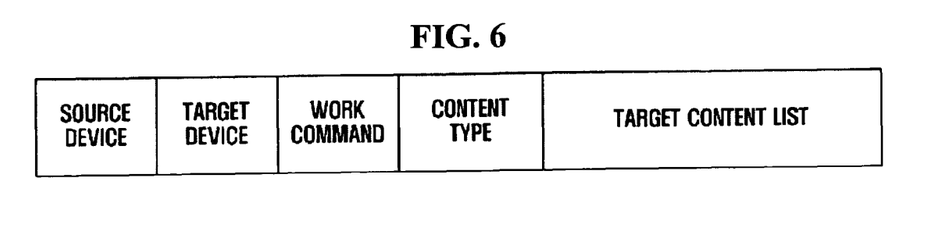
FIG. 6 illustrates a work command transmitted to a target device after item selection according to an exemplary embodiment.

FIG. 6 illustrates a work command transmitted to a target device after item selection according to an exemplary embodiment. Information may be transmitted to a target device that includes selected items of the work command column, the content type column, and the target device column, as well as a target content list. In addition, the data format may further include a source device for when the user desires to watch content stored in a device through another device or to copy content stored in a device to another device. The target content list includes content stored locations and content titles.

The content titles may be substituted with hardware addresses. Content stored locations may indicate specific target devices or specific locations of the specific target devices.

The command message can be transmitted on a home network through unicast or broadcast. When the command message is broadcast, a source device and a target device receive all command messages existing on the home network and check if information indicating the source device or the target device is included in a source device field or a target device field of each of the command messages. If such information is included, the source device or the target device executes a work command corresponding to a content type included in a corresponding command message. If such information is not included, the source device or the target device ignores the corresponding command message.

Figure 7:
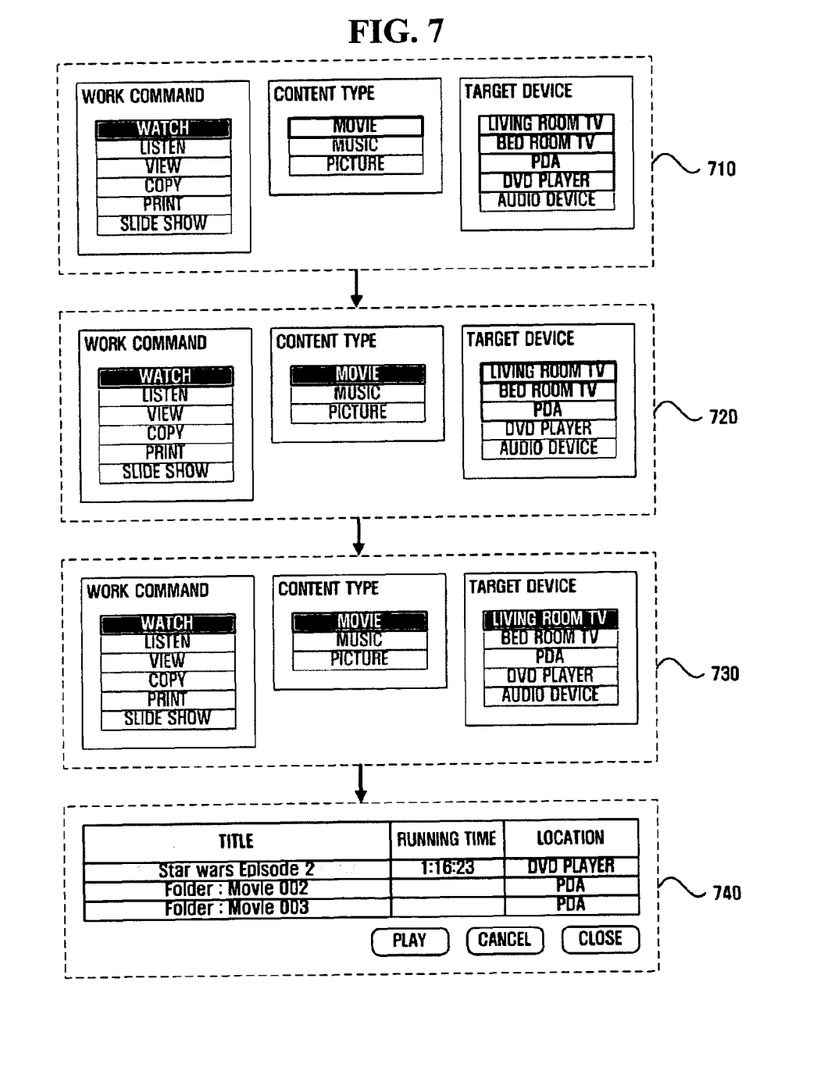
FIG. 7 illustrates a graphic user interface composed of a plurality of columns according to a first exemplary embodiment.

FIG. 7 illustrates a graphic user interface composed of a plurality of columns according to a first exemplary embodiment. Columns include a work command column, a content type column, and a target device column.

Figure 13:
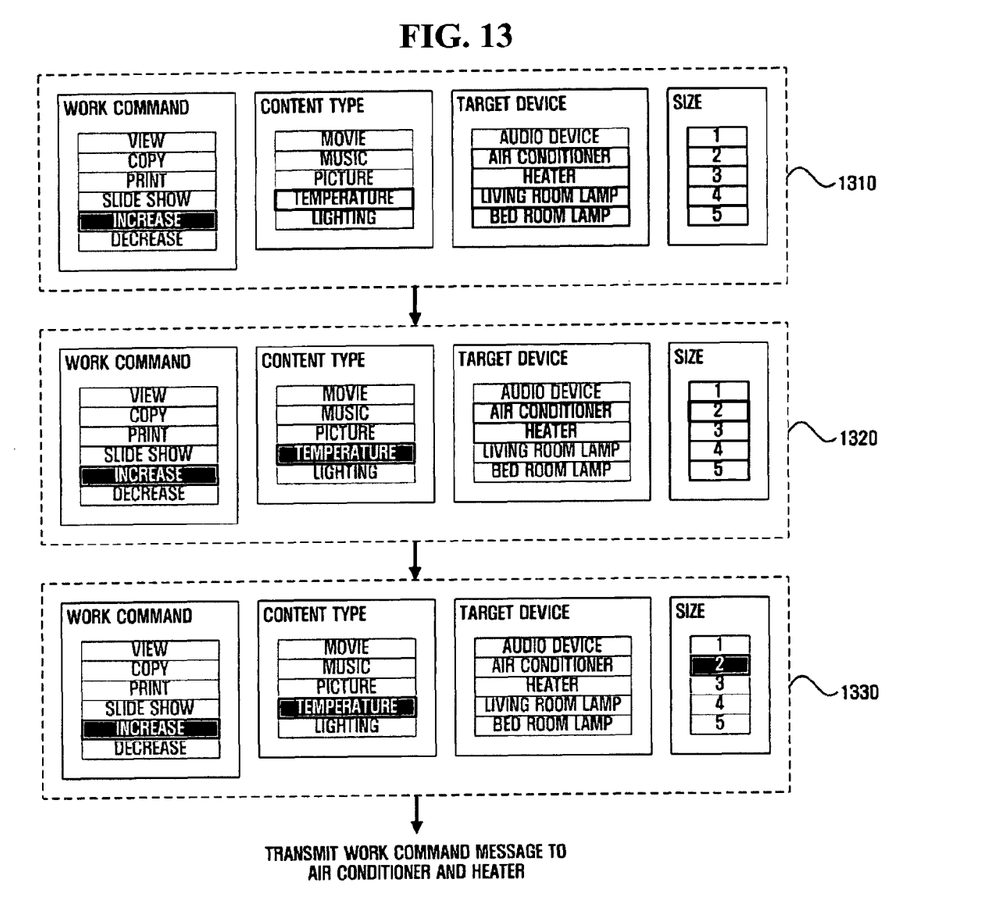
FIG. 13 illustrates a graphic user interface composed of a plurality of columns according to a fourth exemplary embodiment.

The work command column of FIG. 7 includes a watch item, a listen item, a view item, a copy item, a print item and a slide show item. While not shown in FIGS. 7, 9 and 11, the work command column may also include an increase item and a decrease item, as shown in FIG. 13. The content type column of FIG. 7 includes a movie item, a music item, and a picture item. While not shown in FIGS. 7, 9 and 11, the content type column may also include a photo item, a temperature item and a lighting item as shown in FIG. 13. The target device column of FIG. 7 includes a living room TV item, a bed room TV item, a PDA item, a DVD player item, an audio device item. While not shown in FIGS. 7, 9 and 11, the target device column may also include a PC item, a CD player item, an air conditioner item, and a heater item, as shown in FIG. 13.

Once the watch item of the work command column is selected by a user, the determining unit 430 determines items associated with the watch item among items of the content type column and the target device column and activates the associated items through the display unit 440 as in 710 of FIG. 7.

Since an item of the content type column associated with the watch item is a movie item, only the movie item of a content type column is activated, while music and picture items are deactivated. In addition, since items of the target device column associated with the watch item are the living room TV, the bed room TV, the PDA, and the DVD player, only the associated items are activated and the other items of the target device column are deactivated as in 710 of FIG. 7.

The user can select a user's desired item among the activated items of the content type column and the target device column. In FIG. 7, the movie item of the content type column is selected by the user as in 720 of FIG. 7.

After the movie item of the content type column is selected, the determining unit 430 determines a list to be activated on a screen. Since the selected item of the work command column is the watch item and items of the target device column associated with the item of the content type column, i.e., the movie item, are the living room TV item, the bed room TV item and the PDA, only the watch item, the movie item, and the living room TV item, the bed room TV item and the PDA are activated, while the other items are deactivated as in 720.

As described above, the determining unit 430 may determine whether to activate items of columns using a previously stored table in which an item of a column is mapped to items of the other columns according to its characteristics or using information about items of the work command column and the content type column collected from each item of the target device column when receiving the selection command. For example but not by way of limitation, the DVD player item may not be matched to the view item and the movie item, and such matching may be set by the user.

After the user selects the living room TV item of the target device column and items of all the other columns as in 730 of FIG. 7, a target content list is output through the display unit 440 as in 740 of FIG. 7. The work command may be executed for user's desired content through the selected item of the target device column. In FIG. 7, "play" means execution of the work command, "cancel" means return to a previous stage, and "close" means termination of the use of a service.

Figure 8:
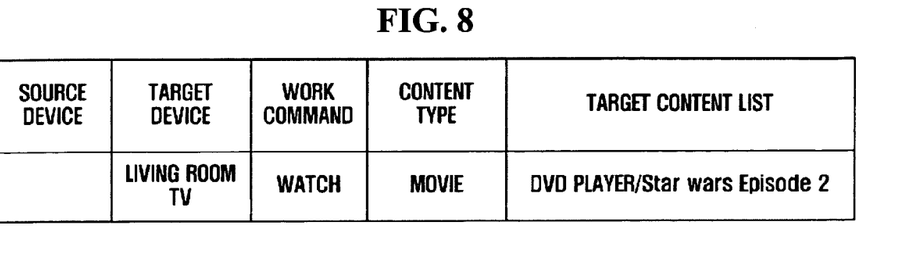
FIG. 8 illustrates a command message transmitted to a target device according to the first exemplary embodiment illustrated in FIG. 7.

FIG. 8 illustrates a command message transmitted to a target device according to the first embodiment illustrated in FIG. 7, in which a list of the target device, the work command, the content type, and a target content list are displayed. A source device field is empty because a copy process is not included.

Figure 9:
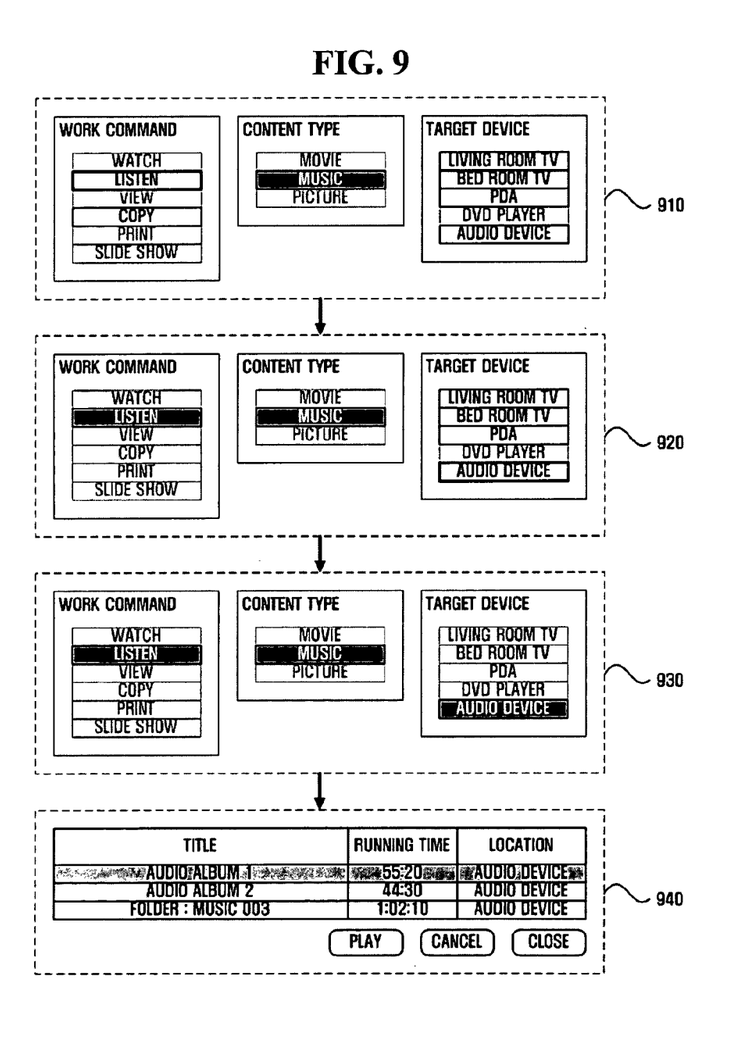
FIG. 9 illustrates a graphic user interface composed of a plurality of columns according to a second exemplary embodiment.

FIG. 9 illustrates a graphic user interface composed of a plurality of columns according to a second exemplary embodiment. The user can determine a column selection order. In FIG. 9, the user determined column selection order is the content type column, the work command column, and then the target device column.

If the user selects a music item of the content type column, the determining unit 430 activates a listen item and a copy item of the work command column associated with the music item, and activates the living room TV item, the bed room TV item, and the PDA item, and the audio device item associated with the music item as in 910 of FIG. 9.

If the user selects a listen item of the work command column, the determining unit 430 activates items of the target device column associated with the listen item. However, in FIG. 9, since items of the target device column associated with the music item and the listen item are the same as those of the target device column associated with the music item, there is no change in 920.

If the user selects an audio device item of the target device column, a list of music files that can be reproduced by the selected audio device item is output on the screen as in 930 of FIG. 9.

For example but not by way of limitation, if a PC item was present in the target device column and selected by the user, a list of music files stored in the PC would be output on the screen. Alternatively, if an audio device item of the target device column is selected, a list of music files of a currently inserted tape, an LP or a CD is output on the screen.

The user then can select a music file from the displayed list as in 940 and listen to the selected music file.

Figure 10:
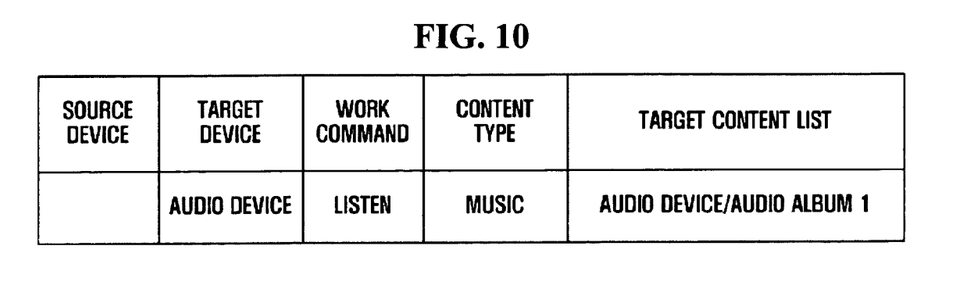
FIG. 10 illustrates a command message transmitted to a target device according to the second exemplary embodiment illustrated in FIG. 9.

FIG. 10 illustrates a command message transmitted to a target device according to the second exemplary embodiment illustrated in FIG. 9, in which a list of the target device, the work command, the content type, and a target content list are displayed and a source device field is empty because a copy process is not included.

Figure 11:
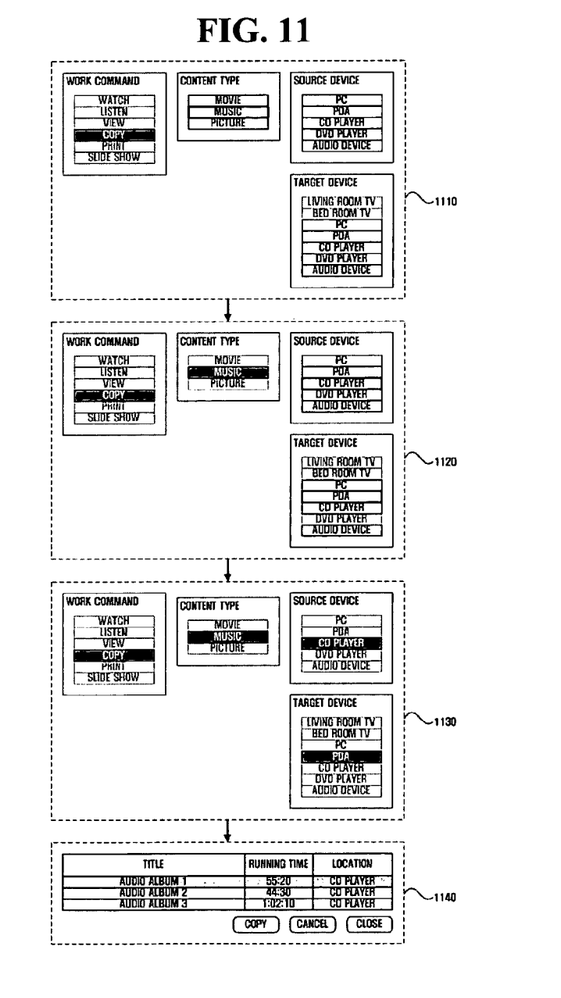
FIG. 11 illustrates a graphic user interface composed of a plurality of columns according to a third exemplary embodiment.

FIG. 11 illustrates a graphic user interface composed of a plurality of columns according to a third exemplary embodiment. Once a user selects a copy item of the work command column to copy content stored in a specific target device (a source device) to another target device, items of the content type column, the source device column, and the target device column associated with the copy item are activated as in 1110 of FIG. 11.

Since the source device column is generally used for a copy process, the source device column is not always output on the screen, but is output on the screen only when the user selects the copy item.

If the user selects an item of the content type column as in 1120 and selects items of the source device column and the target device column as in 1130, a list of content is output on the screen and the user can select content from the output list and perform the copy process as in 1140, as shown in FIG. 11.

Figure 12:
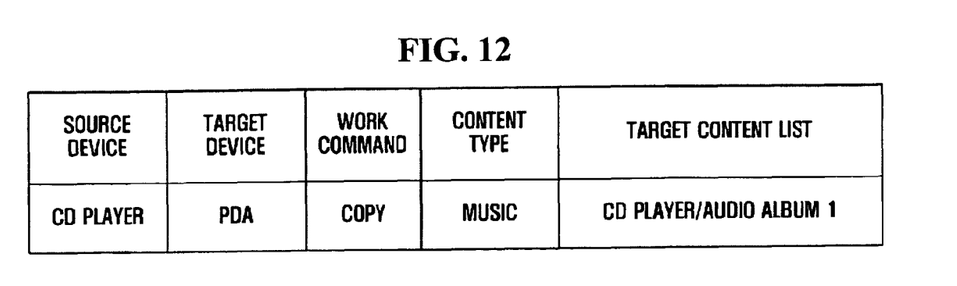
FIG. 12 illustrates a command message transmitted to a target device according to the third exemplary embodiment illustrated in FIG. 11.

FIG. 12 illustrates a command message transmitted to a target device according to the third embodiment illustrated in FIG. 11, in which a list of the target device, the work command, the content type, and a target content list are displayed. The source device and the target device recognize that they are selected and perform the copy process with respect to the selected content.

FIG. 13 illustrates a graphic user interface composed of a plurality of columns according to a fourth exemplary embodiment. A user may cause a target device to execute a work command with respect to a user's desired content type without knowing the operation state of the target device. In other words, if the user input a 2° C. increase item of the work command column with respect to a temperature item of the content type column into the target device, the air conditioner item and the heater item associated with the temperature item operate to increase temperature by 2° C.

The user first selects an increase item of the work command column as in 1310 and selects the temperature item of the content type column as in 1320. Once the user then selects a size that is the amount of increase or decrease as in 1330, a corresponding command message is transmitted to the air conditioner and the heater. While this exemplary embodiment discloses that both the heater and the air conditioner can be simultaneously adjusted, such simultaneous adjustment is not necessary to practice the invention.

Figure 14:
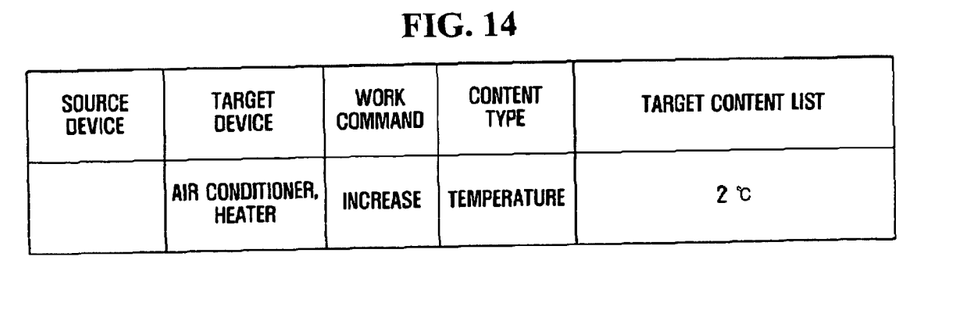
FIG. 14 illustrates a command message transmitted to a target device according to the fourth exemplary embodiment illustrated in FIG. 13.

FIG. 14 illustrates a command message transmitted to a target device according to the fourth embodiment illustrated in FIG. 13, in which a list of the target device, the work command, the content type, and a target content list are displayed and a source device field is empty because a copy process is not included. A command message in which a plurality of target device items are indicated, or command messages, in each of which a single target device item is indicated, may be transmitted.

Figure 15:
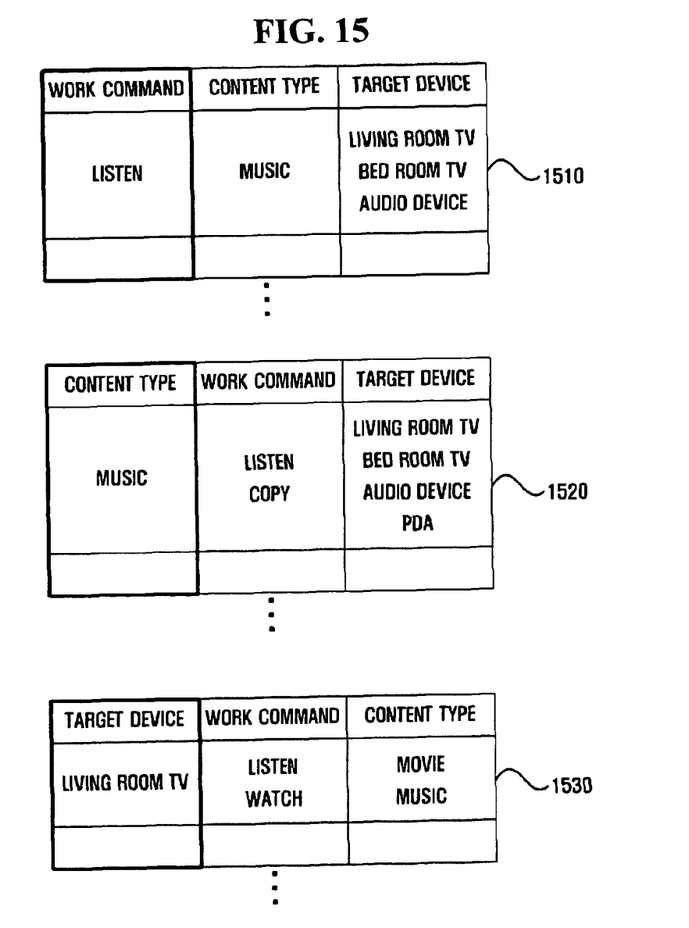
FIG. 15 illustrates a table in which an item of a column is mapped to items of the other columns according to its characteristic according to an exemplary embodiment.

FIG. 15 illustrates a table in which an item of a column is mapped to items of other columns according to its characteristic according to an exemplary embodiment. The table may be stored in the storing unit 410 as separate tables, in each of which an item of a column is mapped to items of other columns according to its characteristic.

Thus, a work command table 1510 may include items of the content type column and the target device column associated with each item of the work command. A content type table 1520 may include items of the work command column and the target device column associated with each item of the content type column. A target device table 1530 may include items of the content type column and the work command column.

The types and number of columns may vary with ways the columns are implemented. For example but not by way of limitation, when the user desires to watch a movie, the user may desire to watch a movie file of a PC on a dining room TV. At this time, if the user is allowed to select only a single target device, the user cannot watch the movie file of the PC on the dining room TV.

Thus, to perform a specific work through at least two devices, the user may select at least two target device items with respect to a specific work command item or a specific content type item. Further to this, the user can select items of at least two different columns with respect to a specific work command item, a specific content type item, or a specific target device item.

As described above, by simultaneously providing a plurality of graphic user interfaces, a user can easily obtain a desired result according to a user's determined order.

In addition, selectable items of other columns according to a selected item of a column are displayed, thereby allowing the user to obtain a desired result without memorizing items of the other columns associated with a selected item of a specific column.

The exemplary embodiments can also be implemented as computer-readable code on a computer-readable recording medium. The computer-readable recording medium can be, e.g., any data storage device that can store data which can be thereafter read by a computer system. Examples of the computer-readable recording medium include (but are not limited to) read-only memory (ROM), random-access memory (RAM), CD-ROMs, magnetic tapes, floppy disks, and optical data storage devices.

The computer-readable recording medium can also be distributed over network-coupled computer systems, so that the computer-readable code is stored and executed in a distributed fashion. Further, the network need not be limited to a home network, but can be any network as would be understood by one of ordinary skill in the art.

Although the present invention has been described in connection with the exemplary embodiments of the present invention, it will be apparent to those skilled in the art that various modifications and changes may be made thereto without departing from the scope and spirit of the invention. Therefore, it should be understood that the above embodiments are not limitative, but illustrative in all aspects.

What is claimed is:

1. An apparatus for providing an interface having a plurality of columns each including at least one item, the apparatus comprising:
   a display unit which simultaneously displays all of the plurality of columns and corresponding items before any item of the plurality of columns is selected;
   a command receiving unit which receives a movement command or a selection command of a selector that selects an item of a first column of the plurality of columns on the interface;
   a determining unit which determines which items to activate in each remaining column of the plurality of columns based on whether the items of each remaining column are associated with the selected item of the first column, wherein the determining unit determines whether to activate the items in each remaining column using a table having the selected item mapped to at least one respective item in each remaining column according to a characteristic of the selected item, and the display unit outputs any activated items using the interface; and
   a transmitting unit which transmits a command message according to an item selection of every column of the plurality of columns, to a target device, after corresponding items from every column of the plurality of columns are selected,
   wherein the plurality of columns comprises a work command column, a content type column, and a target device column, wherein the target device column includes at least one target device which operates the selected work command about the selected content type.

2. The apparatus of claim 1, wherein an item of one of the plurality of columns is configured to be added to or removed from at least one of the work command column, the content type column, and the target device column according to joining or withdrawal of a target device item on a network.

3. The apparatus of claim 1, wherein the command message includes at least one of a work command, a content type, a source device, a target device, a target content location, and a target content list.

4. The apparatus of claim 3, wherein the command message is configured to be broadcast on a network and a corresponding one of the source device and the target device that receives the command message is configured to execute the work command with respect to the content type.

5. A method for providing an interface having a plurality of columns each including at least one item, the method comprising:
displaying simultaneously all of the plurality of columns and corresponding items before any item of the plurality of columns is selected;
receiving a movement command or a selection command of a selector that selects an item of a first column of the plurality of columns on the interface;
determining which items to activate in each remaining column of the plurality of columns based on whether the items of each remaining column are associated with the selected item of the first column, wherein the determining which items to activate comprises using a table having the selected item mapped to at least one respective item in each remaining column according to a characteristic of the selected item;
outputting any activated items using the interface; and
transmitting a command message according to an item selection of every column of the plurality of columns, to a target device, after corresponding items from every column of the plurality of columns are selected,
wherein the plurality of columns comprises a work command column, a content type column, and a target device column, wherein the target device column includes at least one target device which operates the selected work command about the selected content type.

6. The method of claim 5, further comprising adding or removing an item with respect to at least one of the work command column, the content type column, and the target device column according to joining or withdrawal of a target device item on a network.

7. The method of claim 5, wherein the command message includes at least one of a work command, a content type, a source device, a target device, a target content location, and a target content list.

8. The method of claim 7, further comprising:
broadcasting the command message on a network; and
executing the work command with respect to the content type via one of the source device or the target device that receives the command message.

9. A non-transitory computer program product for enabling a computer to execute a method for providing an interface having a plurality of columns each including at least one item, the computer program product comprising:
software instructions for enabling the computer to perform predetermined operations; and
a tangible computer-readable medium bearing the software instructions;
the predetermined operations comprising:
displaying simultaneously all of the plurality of columns and corresponding items before any item of the plurality of columns is selected;
receiving a movement command or a selection command of a selector that selects an item of a first column of the plurality of columns on the interface;
determining which items to activate in each remaining column of the plurality of columns based on whether the items of each remaining column are associated with the selected item of the first column, wherein the determining which items to activate comprises using a table having the selected item mapped to at least one respective item in each remaining column according to a characteristic of the selected item;
outputting any activated items using the interface; and
transmitting a command message according to an item selection of every column of the plurality of columns, to a target device, after corresponding items from every column of the plurality of columns are selected
wherein the plurality of columns comprises a work command column, a content type column, and a target device column, wherein the target device column includes at least one target device which operates the selected work command about the selected content type.

10. The non-transitory computer program product of claim 9, further comprising adding or removing an item with respect to at least one of the work command column, the content type column, and the target device column according to joining or withdrawal of a target device item on a network.

11. The non-transitory computer program product of claim 9, wherein the command message includes at least one of a work command, a content type, a source device, a target device, a target content location, and a target content list.

12. The non-transitory computer program product of claim 11, further comprising:
broadcasting the command message on a network; and
executing the work command with respect to the content type via one of the source device or the target device that receives the command message.

13. The apparatus of claim 1, wherein both items that have been activated and items that have not been activated are displayed in the columns of the interface.

14. The apparatus of claim 13, wherein the items that have not been activated appear differently in the columns of the interface from the items that have been activated.

15. The method of claim 5, wherein both items that have been activated and items that have not been activated are displayed in the columns of the interface.

16. The method of claim 15, wherein the items that have not been activated appear differently in the columns of the interface from the items that have been activated.

17. The non-transitory computer program product of claim 9, wherein both items that have been activated and items that have not been activated are displayed in the columns of the interface.

18. The non-transitory computer program product of claim 17, wherein the items that have not been activated appear differently in the columns of the interface from the items that have been activated.

19. The apparatus of claim 1, wherein the plurality of columns include the work command column, the content type column, and the target device column.

20. The apparatus of claim 19, wherein the work command column comprise work command items comprising a watch item, a listen item, a view item and a copy item,
the content type column comprises content type items which refer to an object of the operation by the target device and comprise a music item, a movie item and a picture item, and
the target device column comprises target device items which refer to a device which operates at least one of the work command items in conjunction with at least one of the content type items.

21. The apparatus of claim 1, wherein, in the table, each item of one of the columns of the plurality of columns is mapped to items of the other columns according to a characteristic of the item of the one column.

* * * * *